United States Patent Office 3,463,842
Patented Aug. 26, 1969

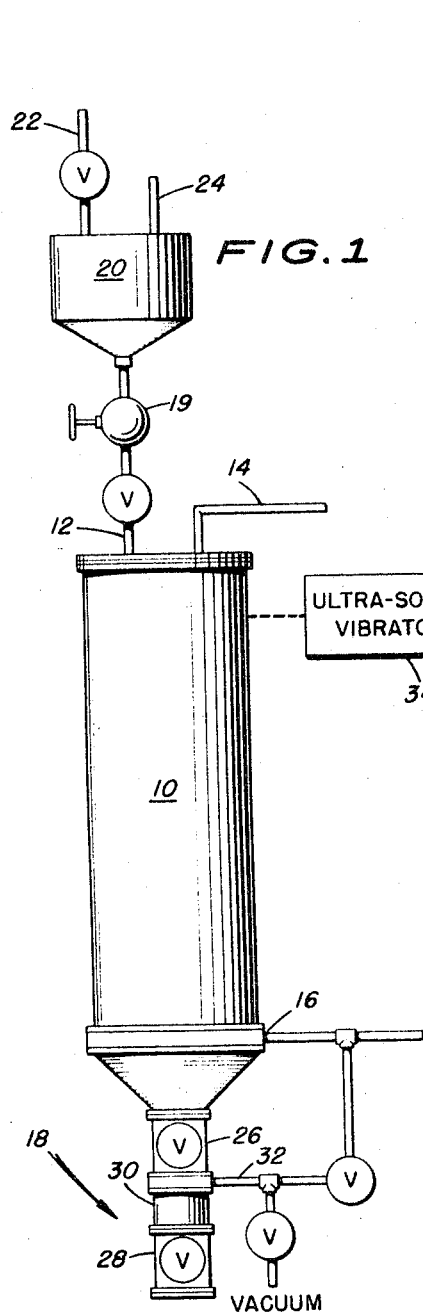
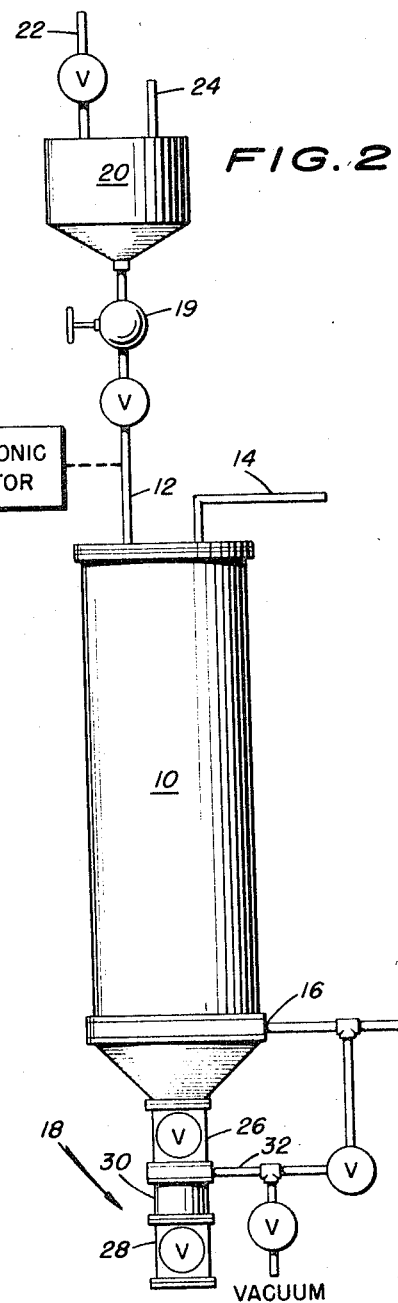

3,463,842
MICROSPHERE PROCESS
Herbert P. Flack, Ellicott City, and Henry H. McClanahan, West River, Md., assignors to W. R. Grace & Co., New York, N.Y., a corporation of Connecticut
Filed June 13, 1967, Ser. No. 645,786
Int. Cl. G21c 21/02; B29b 1/03
U.S. Cl. 264—.5                                4 Claims

ABSTRACT OF THE DISCLOSURE

A process for preparing uniform sized microspheres below 50 microns in diameter from sols or solutions. Uniform microspheres are prepared using an ultrasonic vibrator in the sol feed line or in the column.

---

This invention relates to a process for producing highly uniform, very small, spherical particles from feeds of metal oxides or mixtures with or without carbon. Microspheres of materials such as urania, thoria, plutonia, and other actinide oxides; diluent oxides such as the lanthanide series oxides, zirconia, yttria, and beryllia; and mixtures of these metal oxides with other oxides and with carbon are formed by this process.

In summary, the process of this invention is a method for forming spherical particles from an aqueous feed of metal oxides or mixtures thereof with carbon comprising feeding a continuous stream of the feed into a stream of solvent, dispersing the feed into droplets in the solvent with ultrasonic vibrations, and recovering microspheres from the solvent.

Microspheroidal particles of actinide oxides, diluent ceramic oxides, and mixtures thereof with carbon have become of paramount importance in the field of nuclear fuels. Current reactor designs, especially the designs of the high temperature gas-cooled reactors, have placed very demanding requirements on the fuel employed. The fuel must be resistant to oxidation and fission product release. The fuel must be near theoretical density to provide the requisite efficiency. The fuel elements are usually formed by dispersing the microspheroidal fuel material in a ceramic matrix which is then pressed or compacted into the desired shape under high pressures, and the fuel material must be sufficiently strong to withstand the severe stresses present during compaction. The microspheroidal particles must have a uniform size and shape to effect a homogeneous concentration of fuel in the matrix. Processes for preparing microspheres from metal oxide sols in which the sols are dehydrated to form spherical particles have been previously disclosed. Application Ser. No. 364,931, filed May 5, 1964 now U.S. Patent No. 3,340,567 is directed to a method and apparatus for dispersing uniformly sized droplets of a sol feed in the dehydrating solvent with further refinements in processes for forming microspheres. This method is slow if spheres having a diameter less than 50 microns (after sintering) are desired. A process for preparing microspheres from metal oxide sols and solutions in a solvent which has no dehydrating properties has also been disclosed previously. This case is directed to a method for dispersing uniformly sized droplets of a sol or a solution feed in a solvent system which is chosen from the group consisting of a water-immiscible and water saturated solvent containing dissolved ammonia, or a two-layer solvent system, one layer of which is a water-immiscible, water-saturated solvent, the lower and second layer of which is an aqueous ammonia solution.

The object of this invention is to provide an efficient process for obtaining microspheres from aqueous feeds wherein the feed is dispersed in a solvent (either partially dehydrating, or water-saturated and containing ammonia) with ultrasonic vibrations.

The metal compounds which are most desirable in nuclear reactor fuel elements include the oxides of uranium, thorium, plutonium, zirconium, yttrium, the lanthanides and beryllium, and the respective carbides of these metals. In the process of this invention, microspheres containing these oxides or mixtures of these oxides with carbon are formed by the general procedure of introducing a feed of the metal oxides (and, if desired, carbon) into the chosen solvent, dispersing the feed into highly uniform droplets using ultrasonic vibrations, permitting the droplets to gel or dehydrate, and recovering microspheres from the solvent.

The feed is either an aqueous suspension or a solution of the materials which are desired in the microsphere product. If a suspension, the particles in the suspension should have a size of less than 1 micron and includes aquasols of these materials. If the suspension contains non-colloidal particles, the feed is preferably agitated to insure a uniform distribution of particles therein. Methods for preparing feed suspensions have been previously disclosed and are not critical.

If the feed is an aqueous solution, the solution contains from 0.01 gram per liter up to saturation quantities of dissolved salts of metal cations selected from the group consisting of $U^{+4}$, $(UO_2)^{+2}$, $Th^{+4}$, $Pu^{+4}$, $(PuO_2)^{+2}$, $(ZrO)^{+2}$, $Be^{+2}$, $Y^{+3}$, lanthanides, and mixtures thereof. Additionally the solution can also contain up to 499 grams per liter of suspended metal oxide particles having a size of less than one micron, said metal oxide being selected from the group consisting of uranium dioxide, uranium trioxide, thorium dioxide, plutonium dioxide, plutonium trioxide, zirconium dioxide, beryllium oxide, yttrium oxide, lanthanide oxides, and mixtures thereof; the solution can also contain from 0 to 5 moles of colloidal carbon per mole of metal in the feed. In another embodiment, the solution feed can also contain an ammonia-releasing agent, such as hexamethylenetetramine, acetamide, ammonium carbamate, ammonium cyanate, urea and mixtures thereof. The ammonia-releasing agent concentration in the feed can be from 0 to 300 percent of the stoichiometric concentration required to precipitate the metal in the feed as the hydrous oxide. Methods for preparing these feed solutions have been previously disclosed and are not critical.

If the dehydrating solvent is the chosen mode in this invention, the preferred solvent is a liquid which is immiscible with water and has a limited solubility for water of from 1 to 30 weight percent. The feed droplets are partially dehydrated to form microspheres by transfer of the aqueous phase into the dehydrating solvent. The solvents must be inert, and free of objectional physical characteristics such as emulsifying tendencies, for example. The solvents giving the best results are the higher alcohols. Examples of preferred solvents include hexanol, ethyl-hexanol, butanol and ethyl-butanol. Solvents having solubilities for water which are too high can be mixed with sufficient water to reduce the solubilities to the desired level.

When the chosen solvent is the water-saturated solvent, the solvents giving the best results are the higher alcohols and hydrocarbons which are substantially water-immiscible. The solvents must be inert, free of objectionable physical properties such as emulsifying tendencies, and must have a density low enough to permit settling of the microspheres. However, the solvent selected can have low saturation concentrations with water. Solvents with solubilities for water of from 1 to 30 percent have provided satisfactory results. Examples of preferred solvents include hexanol, butanol, benzene, and toluene.

When the column process is used, droplets are dispersed in a stream of solvent flowing in the column. If the dehydrating solvent is used, the stream of solvent is flowing upwardly in the column; the droplets are dehydrated as they move downward through the solvent to a final water content of less than 50 weight percent and preferably less than 25 weight percent in the column.

In the non-dehydrating solvent which is water saturated and contains dissolved ammonia, the droplets are dispersed into the solvent flowing in the column, much the same as described supra. Clearly, however, the droplets are not dehydrated, but are gelled by the action of the ammonia as they move downward through the solvent.

If the two-layer solvent system is used in the column, there is generally no upwardly solvent flow in the column. The droplets are dispersed in the top layer, or the water-immiscible, water-saturated layer. As the droplets fall through this layer, they pass through the interface between this layer and the aqueous ammonia layer into the aqueous ammonia layer, where they are totally gelled.

Whatever solvent is chosen for the column process, the feed is fed as a uniform stream into the top of the column. Preferably, the feed is injected through a small diameter tube such as a hypodermic needle. The feed is dispersed as uniform droplets in the solvent with ultrasonic vibrations. The ultrasonic vibrations can be applied to the system by several techniques which will be described in greater detail with reference to the drawings. An ultrasonic probe can be placed directly in the column in a position which directs ultrasonic waves into a zone of solvent through which the feed passes. By varying the frequency and amplitude of the vibrations, droplets having the desired size and uniformity can be formed. Alternatively, an incoming stream of feed can be subjected to ultrasonic vibrations immediately prior to its entrance into the solvent system.

Referring to FIGURES 1 and 2, it will immediately be seen that the general description has been chosen to refer to a single layer column system, either with a dehydrating or a water-saturated, ammonia-containing solvent. The modifications necessary in the column to create a two-layer solvent system form no part of this invention, and consist of an inlet and outlet for the aqueous ammonia; the two-layer column apparatus is more fully described in U.S. Ser. No. 688,147, filed Dec. 5, 1967, a copending application.

Referring to FIGURE 1, the extraction column 10 has a feed introduction means 12 and a solvent inlet 16 and a spherical particle outlet 18 at the lower end. The feed inlet means 12 is connected to a feed supply means which can comprise a feed reservoir 20, feed suspension inlet means 22, and gas pressure supply means 24, whereby the feed in the reservoir 20 is supplied under gas pressure to the feed introducing means 12. A flowmeter device, such as a rotometer, is shown at 19. A metering pump system can also be used to supply the feed.

The feed introduction means 12 is preferably a small tube such as a hypodermic needle having an inner diameter about 0.15 mm.

The spherical particle outlet 18 can comprise a first valve 26 connected to, and in communication with, the bottom of column 10, a second valve 28 having an inlet and an outlet, and an intermediate chamber 30 communicating with the outlet of the first valve and the inlet of the second valve. A flushing fluid conduit 32 is connected to a solvent source and chamber 30 for delivering solvent into the chamber, flushing the accumulated microspheres therein through the second valve 28. A vacuum source to evacuate the air trapped between the two valves after removal of the product is provided. Any other arrangement for removing microspheres from the column without significantly disturbing the conditions in the column could be used.

The ultrasonic vibrator 34 extends into the interior of column 10 in a position which will subject a zone in the path of the suspension feed to ultrasonic vibrations. The ultrasonic vibrator can be any of the commercial ultrasonic vibrators; types having a variable vibration frequency and power input are preferred. The ultrasonic vibrator probe can extend through the side of the column as shown in FIG. 1 or through the top of the column. Any other arrangement by which ultrasonic vibrations can be applied to a zone in the path of the feed stream can be employed.

FIG. 2 shows an alternative embodiment wherein the feed stream is subjected to ultrasonic vibrations immediately prior to its entrance into the column 10. The ultrasonic vibrator 36 is positioned to apply ultrasonic vibrations directly to the incoming stream. The ultrasonic vibrator probe can extend into the feed stream at the hypodermic needle, can touch the hypodermic needle, or, as shown in Patent No. 3,204,934, it can be positioned against a diaphragm in contact with the feed stream. Alternately, the probe can transmit vibrations through the body of the feed without being attached to the needle through metal connections. The ultrasonic vibrations disperse the feed stream as it enters the solvent in column 10.

In the embodiments as shown in FIG. 1 and FIG. 2, the feed is introduced into the top of the column, and the dehydrated or gelled microspheres are removed from the bottom. Concurrent processes can also be used where the velocity of the solvent upward through the column is sufficient to carry the suspension droplets and microspheres upward in its flow. For example, the feed can be introduced at the middle or bottom of column 10 and the microspheres can be removed together with the solvent through outlet 14. The microspheres can be separated from the solvent by sedimentation, filtration, or certrifugation.

Our invention is further illustrated by the following specific but non-limiting examples.

EXAMPLE 1

A previously prepared uranium dioxide aquasol, produced using electrodialysis of a uranyl chloride solution at 40° C., containing the equivalent of 170 g. $UO_2$/l., to which sufficient hexamethylene tetramine had been added to yield a feed pH of 3.8, was injected through a 25 gauge hypodermic needle at a flow rate of 6 cc./min. into dehydrating hexanol having a temperature of 140° F. The stream of sol was broken into very small uniform droplets by the action of a Brownwell Biosonik ultrasonic probe of 20 kilocycles/sec. frequency inserted into the body of hexanol.

Black, uniform, reflective, microspheres of uranium dioxide were produced. The spheres ranged in size from 5–30 microns. The size of the microspheres was varied by changing the flow rate of the sol feed and the strength of the vibrations.

EXAMPLE 2

A rare earth chloride solution (25 cc.) containing 0.0644 g. RE/cc. was mixed with 6.5 cc. of hexamethylenetetramine solution containing 25 g. HMT/100 cc. solution. The pH of this mixture was 3.7. This mixture was fed into dehydrating hexanol at 130–140° F. The stream was broken into small uniform droplets by the action of a Brownwell Biosonik ultrasonic probe inserted into the body of the hexanol. Small 2–5 micron diameter spheres were recovered having good surface properties.

EXAMPLE 3

A $UO_2$ sol containing 127 g. $UO_2$/l. (made by electrodialysis) was combined with a rare earth chloride solution containing 0.06 g. RE/cc. A hexamethylene tetramine solution containing 250 g. HMT/liter was slowly added (with agitation) to this mixture until a pH of 2.7 was obtained; about 1 cc. of the HMT solution was required for 25 cc. of the mixture. This mixture was fed into dehydrating hexanol at 140° F., at the rate of 4 cc./min. The stream was broken into small uniform droplets using the ultrasonic vibrator so described in Example 2. Small 0.5–5 micron diameter spheres were recovered.

EXAMPLE 4

A mixture of $UO_2$ sol and rare-earth chloride solution was prepared as in Example 3. A hexamethylenetetramine solution was added to bring the pH to 2.7. This mixture was fed to the hypodermic needle at 4.5 cc./min. The column contained hexanol saturated with water, through which ammonia gas was being bubbled. The temperature of the solvent was 154° F., and the hexanol was saturated with ammonia at that temperature. The pH of the hexanol was 8.6. The feed stream was broken up into small droplets by using the ultrasonic probe inserted into the body of the hexanol. Good spheres having a 1–10 micron diameter were obtained.

EXAMPLE 5

Using the mixture prepared as in Example 3, and the column conditions and solvent system described in Example 4, the ultrasonic probe was attached to the hypodermic needle so that the feed stream was formed into small droplets as it left the needle. Good microspheres having a 1–10 micron diameter were obtained.

EXAMPLE 6

Using the mixture prepared as in Example 3, 5 cc./mm. is fed through the hypodermic needle into the column containing a two layer solvent system. The top layer is hexanol, water saturated at 80–100° F. The lower layer is a saturated aqueous solution of ammonia at 80–100° F. The ultrasonic probe is attached to the needle so that the feed stream is formed into small droplets as it leaves the needle. Good microspheres of 1–30 microns diameter are recovered.

EXAMPLE 7

The microspheres formed in Examples 4, 5, and 6 were dried using the following method. After the microspheres were recovered from the column, they were separated from the solvent, immersed in concentrated ammonia solution for about 15 minutes, and then washed free of excess salts with distilled water. In order to prevent clumping of the spheres during drying, the surface water was removed with a small amount of acetone. The spheres were then dried under vacuum using successively programmed temperatures of 40°, 60°, 80°, 100° and 120° C. for 1½ hours at each temperature. An alternate method of drying the spheres involves the use of a warm fluidizing gas (nitrogen, argon) to remove the water after the acetone rinse. The spheres are then ready for pretreating at 500° C. in hydrogen and sintering in hydrogen at higher temperatures. The sintered microspheres are then ready to be coated and used in nuclear fuel reactors.

It is apparent from the data in the examples above that the use of an ultrasonic vibrator simplifies the preparation of microspheres in the 1 to 10 micron size range. Essentially all of the product recovered in Examples 1 through 5 were in this size range. The distribution is slightly wider when the two layer solvent system is used in the column. This is shown in Example 6 where the microspheres were in the 1 to 30 micron size range.

Obviously, many modifications and variations of the invention as hereinabove set forth can be made without departing from the essence and scope thereof, and only such limitations should be applied as are described in the claims.

We claim:

1. A process for forming spherical particles from an aqueous feed of particles of metal oxide selected from the group consisting of uranium dioxide, uranium trioxide, thorium dioxide, plutonium dioxide, plutonium trioxide, zirconium oxide, yttrium oxide, lanthanide oxides, beryllium oxide, mixtures thereof, and mixtures thereof with colloidal carbon, and solutions of metal ions selected from the group consisting of $U^{+4}$, $(UO_2)^{+2}$, $Th^{+4}$, $Pu^{+4}$, $(PuO_2)^{+2}$, $(ZrO)^{+2}$, $Be^{+2}$, $Y^{+3}$, lanthanides, mixtures thereof, and mixtures thereof with colloidal carbon comprising feeding the aqueous feed into a column solvent system containing at least one solvent, dispersing the feed into droplets in the solvent with ultrasonic vibrations, and removing microspheres from the solvent.

2. The process of claim 1 wherein the solvent system is chosen from the group consisting of a dehydrating solvent, a water-immiscible and water-saturated solvent containing ammonia dissolved therein, and a two-layer solvent-system, one layer of which is a water-immiscible and water-saturated solvent, the second and lower layer of which is an aqueous ammonia solution.

3. The process of claim 2 wherein a zone of solvent in the path of the feed is subjected to ultrasonic vibrations to disperse the feed into the droplets.

4. The process of claim 2 wherein the aqueous feed is subjected to ultransonic vibrations immediately prior to its entrance into the solvent, whereby the feed is dispersed into droplets in the solvent.

References Cited
UNITED STATES PATENTS

| | | | |
|---|---|---|---|
| 3,060,510 | 10/1962 | Fischer et al. | 264—9 |
| 3,204,934 | 9/1965 | Graham et al. | 259—4 |
| 3,235,326 | 2/1966 | Slooten | 264—9 |
| 3,325,858 | 6/1967 | Ogden et al. | 264—9 |
| 3,352,950 | 11/1967 | Helton et al. | 264—0.5 |

BENJAMIN R. PADGETT, Primary Examiner

M. J. SCOLNICK, Assistant Examiner

U.S. Cl. X.R.

252—301.1; 264—9